United States Patent [19]
Yamamura

[11] Patent Number: 6,097,299
[45] Date of Patent: Aug. 1, 2000

[54] POSITION DETECTING APPARATUS FOR MOTOR ACTUATOR

[75] Inventor: Kengo Yamamura, Inasa-gun, Japan

[73] Assignee: ASMO Co., Ltd., Shizuoka-Pref, Japan

[21] Appl. No.: 09/203,829

[22] Filed: Dec. 1, 1998

[30] Foreign Application Priority Data

Dec. 5, 1997 [JP] Japan .................................. 9-335963

[51] Int. Cl.⁷ .............................................. G08B 21/00
[52] U.S. Cl. ................................. 340/686.3; 340/686.1; 73/802.191; 73/862.328
[58] Field of Search ........................ 340/686.1, 686.3, 340/648; 73/862.191, 862.325, 862.328

[56] References Cited

U.S. PATENT DOCUMENTS 5,147,989 9/1992 Ito ........................................ 200/11 R
5,705,755 1/1998 Yamamura .......................... 73/862.191
5,791,204 8/1998 Torii et al. ............................. 74/606 R

*Primary Examiner*—Edward Lefkowitz
*Attorney, Agent, or Firm*—Fish & Richardson P.C.

[57] ABSTRACT

For a position detector of a motor actuator, two types of flanges are provided. Each flange has a movable contact, on which fixed sliding contacts slide to detect a predetermined rotational position of a motor when the flange is driven by the motor. Either one of the flanges is used in the position detector depending on the combination of motor rotation directions (forward/reverse) and doors (left/right). Thus, a single cover plate which accommodates the flange may be used for both doors irrespective of the motor rotation direction.

8 Claims, 10 Drawing Sheets

POSITION DETECTING APPARATUS FOR MOTOR ACTUATOR

CROSS REFERENCE TO RELATED APPLICATION

This application relates to and incorporates herein by reference Japanese Paten Application No. 9-335963 filed on Dec. 5, 1997.

BACKGROUND OF THE INVENTION

1. Field of the Invention

The present invention relates to a position detecting apparatus for a moving object. More particularly, the present invention relates to a position detecting apparatus, which may be used irrespective of motor rotation direction.

2. Related Art

Various position detectors for a moving body such as a vehicle power window device are proposed in JP-A-8-29114 and JP-A-9-236431.

In the proposed position detector, a moving contact plate and a pulse plate are accommodated in a cover plate to be driven by a motor output shaft. A plurality of fixed sliding contacts are directly fixed to the cover plate. The moving contact plate is provided with a moving contact for a detection of a specified rotational position of the motor output shaft, while the pulse plate is provided with a sequential pulse pattern for a detection of each rotational movement of the motor output shaft. Thus, the sliding contacts slide on the moving contact plate and the pulse plate to generate pulse signals indicative of rotational positions of the motor output shaft, when the moving contact plate and the pulse plate rotate with the rotation of the motor.

In the vehicle power window device, there are cases where a forward direction rotation of the motor output shaft is used to raise a door window glass and where a reverse direction rotation of the motor output shaft is used to raise the window glass. Further, the position detector used in the vehicle power window device is attached to the motor output shaft in opposite directions depending on the cases where the power window device is for the vehicle left side door or the vehicle right side door. Thus, as the moving contact plate rotates in different directions depending on the motor rotation direction and the side of the door, the position detector must be designed separately even for the same vehicle depending on the motor rotation direction and the side of the door.

SUMMARY OF THE INVENTION

It is therefore an object of the present invention to provide a position detecting apparatus, which may be used commonly irrespective of motor rotation directions and sides of vehicle doors.

According to one aspect of the present invention, two moving contact plates are provided for use in a position detector. Each moving contact plate is rotated by a motor output shaft and stops rotation when it abuts with a stopper protrusion defining a specified rotational position of the motor output shaft. The two contact plates have moving contacts to detect the specified rotational position when the motor output shaft rotates in the forward direction and in the reverse direction, respectively. Either one of the two moving contact plates is selectively mounted in the position detector, depending on the motor output shaft rotation direction. Thus, even if the motor output shaft rotation directions are opposite between a vehicle left side door and a vehicle right side door, the position detector may be used for both doors by changing the moving contact plates depending on the sides of the vehicle doors.

According to another aspect of the present invention, A cover plate is formed symmetrially between its right side and its left side with respect to a line crossing the center thereof. A stopper protrusion is provided on the line and at the side of a fixed sliding contact fixed to the cover plate. A moving contact plate is formed symmetrically with respect to its top side and its bottom side. The moving contact plate has moving contacts on its both sides to detect the specified rotational position when the motor output shaft rotates in the forward direction and in the reverse direction, respectively. Either one of the sides is used to contact with the fixed sliding contact in the position detector, depending on the motor output shaft rotation direction. Thus, even if the motor output shaft rotation directions are opposite between a vehicle left side door and a vehicle right side door, the position detector may be used for both doors by changing the sides of the moving contact plate depending on the sides of the vehicle doors.

BRIEF DESCRIPTION OF THE DRAWINGS

Other objects, features and advantages of the present invention will be apparent from the following detailed description made with reference to the accompanying drawings. In the drawings.

DETAILED DESCRIPTION OF THE PREFERRED EMBODIMENT

The present invention will be described with reference to various embodiments of a motor actuator having a position detector. It is to be noted that the same or similar component parts are designated by the same or similar reference numerals throughout the embodiments.

First Embodiment

Figure 1:
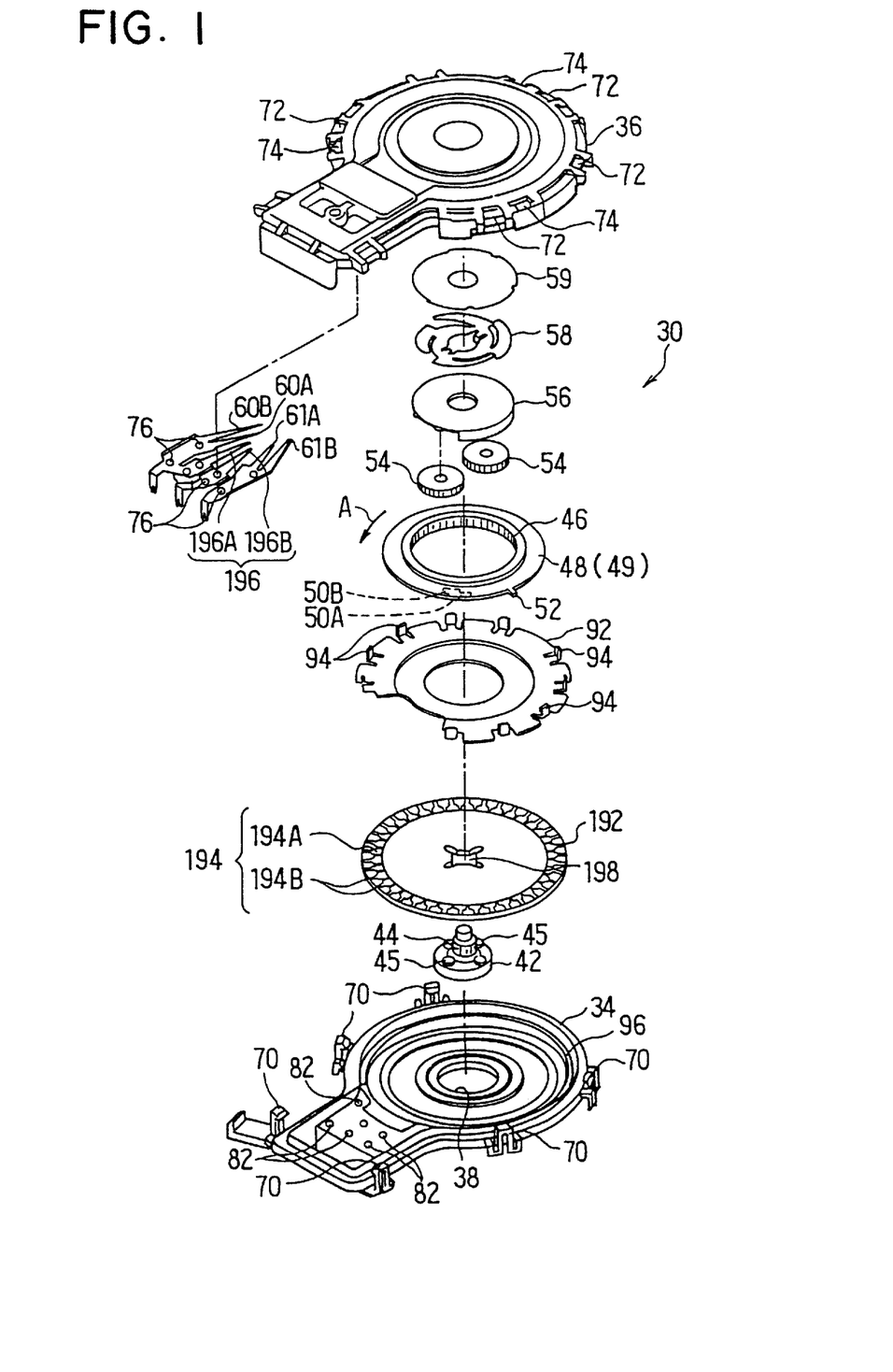
FIG. 1 is an exploded perspective view showing a position detector of a motor actuator according to a first embodiment of the present invention.
Figure 2:
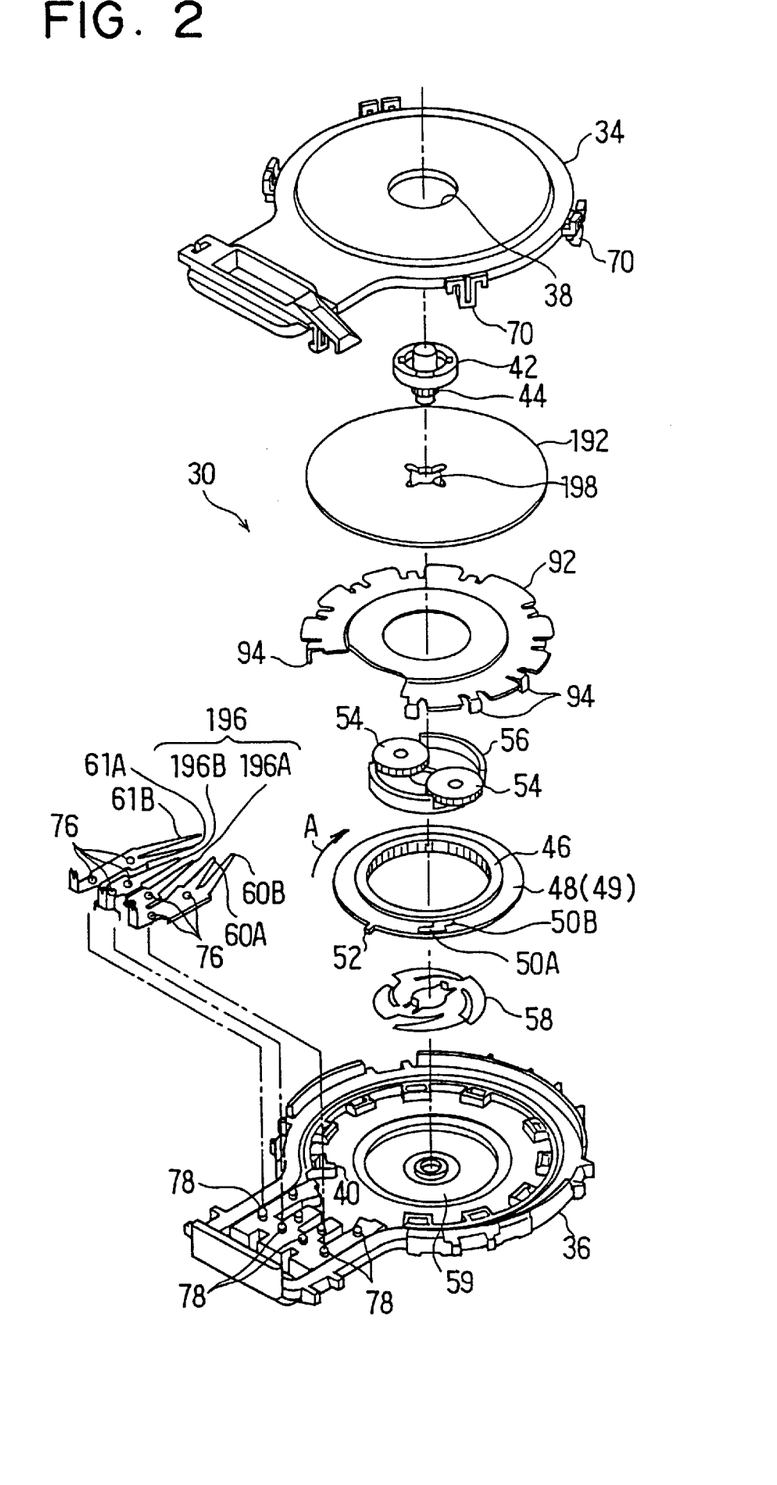
FIG. 2 is an exploded perspective view showing the position detector under a condition viewed in the opposite direction from FIG. 1.

Referring to FIGS. 1 and 2 showing a position detector from opposite sides, a position detector 30 has a base plate 34 and a cover plate 36 both made of resin, between which a ring gear 46, pulse plate 192 and other component parts are encased. Sliding contacts, 60A, 61A, 60B, 61B, 196 made of conductive material are fixed to the cover plate 36. This position detector 30 is a part of a motor actuator 10 shown in FIGS. 6 and 7. The motor actuator 10 is applied to a power window device of a vehicle.

Figure 6:
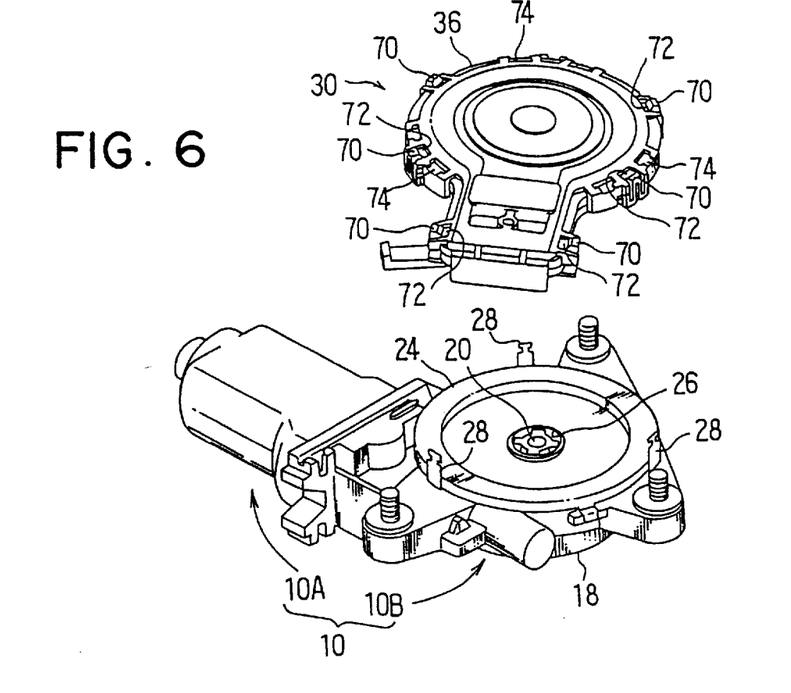
FIG. 6 is an exploded perspective view showing the motor actuator having the position detector.
Figure 7:
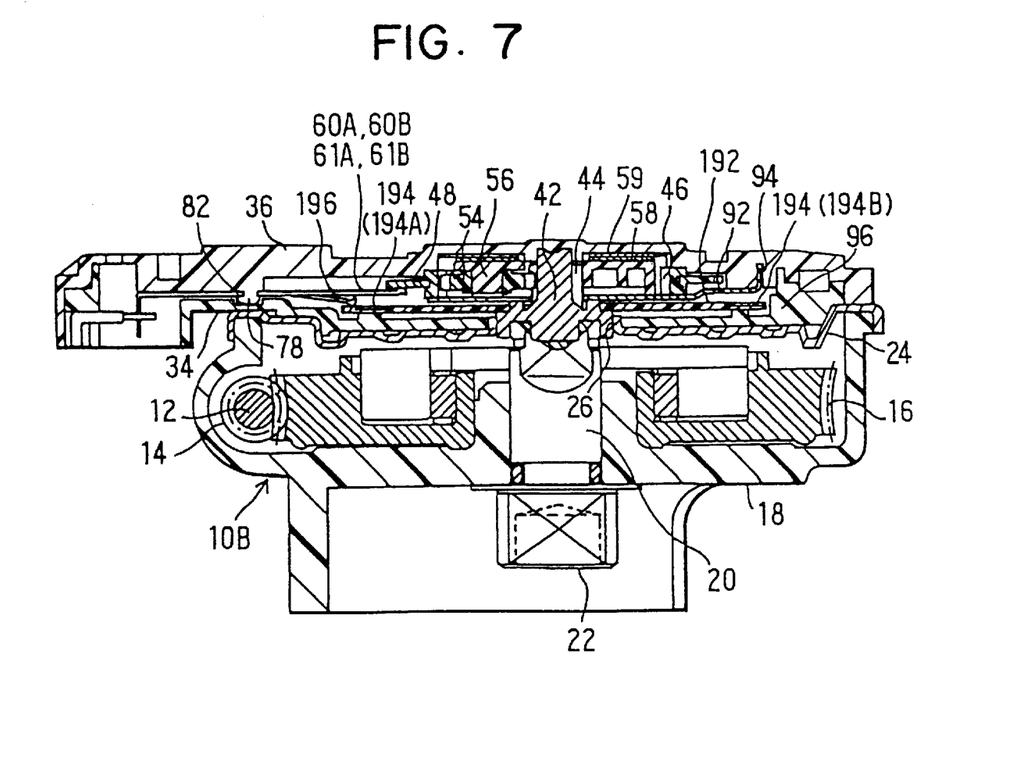
FIG. 7 is a cross-sectional view showing the motor actuator shown in FIG. 6.
Figure 8:
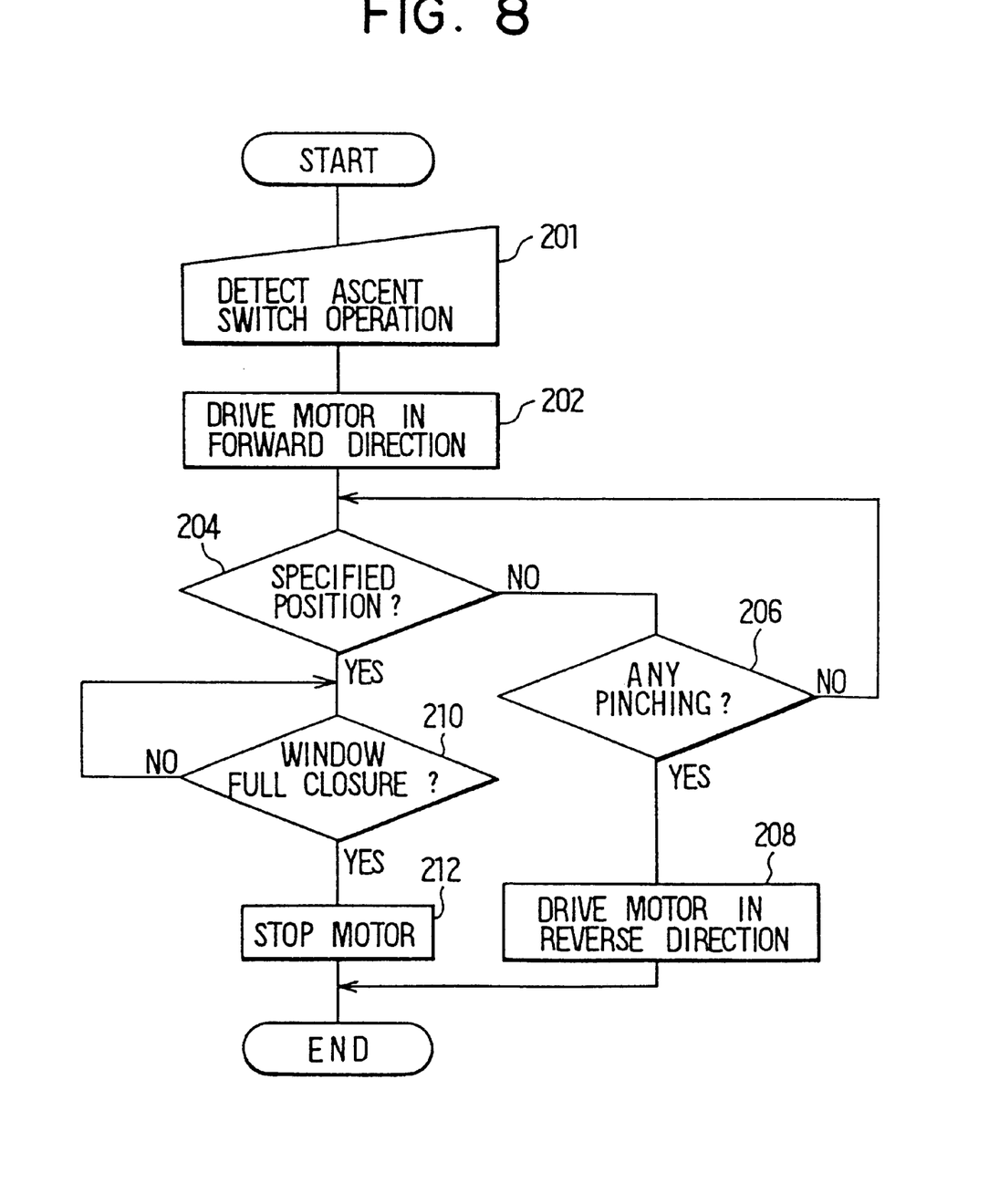
FIG. 8 is a flow chart showing a control process for the motor actuator used for a window glass.

In FIGS. 6 and 7, the motor actuator 10 comprises a motor part 10A, a gear part 10B connected to the motor part 10A, and the position detector 30. A rotation shaft 12 of the motor part 10A extends into the gear part 10B, and a worm gear 14 is formed at the top end of the rotation shaft 12. The worm gear 14 engages with a rotation gear wheel 16 disposed inside the gear part 10B.

In the rotation gearwheel 16, a shaft 20 as a motor output shaft is rotatably supported by a housing 18 of the gear part 10B. Thus, when the motor part 10A is operated and the rotation shaft 12 is rotated, the rotation force is transmitted to the rotation gear wheel 16 through the worm gear 14 so that the motor output shaft 20 is rotated. An output fitting part 22 is located at one end of the shaft 20, and is connected to a driving part of a window regulator (not shown) which drives a window glass of a vehicle door in the upward and downward directions. In the embodiment, it is set so that, when the shaft 20 (output fitting part 22) rotates 3 to 3.5 rotations, for example, the window glass moves 1 stroke.

A cover 24 is attached to the surface opposite to the output fitting part 22 of the gear part 10B, to be integrally connected with the housing 18. An opening 26 is formed in the center of the cover 24, and the top end of the shaft 20 (opposite to end provided with output fitting part 22) is exposed through the opening 26. Several (three, in present embodiment) clamping parts 28 extend from the periphery of the cover 24. Each of the clamping parts 28 is formed to have a T-shaped leading edge, and is used to firmly secure the position detector 30 to the cover 24. The position detector 30 is attached to the cover 24 by fastening these clamping parts 28.

Referring back to FIGS. 1 and 2, the position detector 30 is formed substantially into a thin cylindrical shape. A through hole 38 is formed at a central part of the base plate 34, and a stopper protrusion 40 is formed integrally on an inner peripheral surface of the cover plate 36. The stopper protrusion 40 is provided on the side of the fixed sliding contact 60A. 61A, 60B, 61B and 196. This stopper protrusion 40 stops a ring gear 48 having a flange 48 or 49 when the ring gear 46 rotates to a specified position.

Further, the position detector 30 is equipped with a connection shaft 42. One end of the connection shaft 42 is integrally connected to the shaft 20 of the rotation gear wheel 16 to constantly rotate together with the shaft 20. The other end of the connection shaft 42 protrudes into the inside of the position detector 30 (base plate 34 and cover plate 36) through the through hole 38 formed in the base plate 34. Further, a sun gear 44 constituting a part of a planetary gear train unit is provided proximate to the other end of the connection shaft 42, and engages with planetary gears 54. Further, a plurality (four) of protrusion parts 45 are formed on the connection shaft 42 on a periphery of the sun gear 44, to be inserted into a fitting hole 198 of a pulse plate 192.

Around a periphery of the connection shaft 42, a ring gear 46 constituting a part of the planetary gear train unit is disposed to oppose the sun gear 44. The ring gear 46 is rotatably accommodated in the cover plate 36, and a flange 48 or 49 as a moving contact plate is integrally formed with an outer periphery of the ring gear 46.

Figure 3:
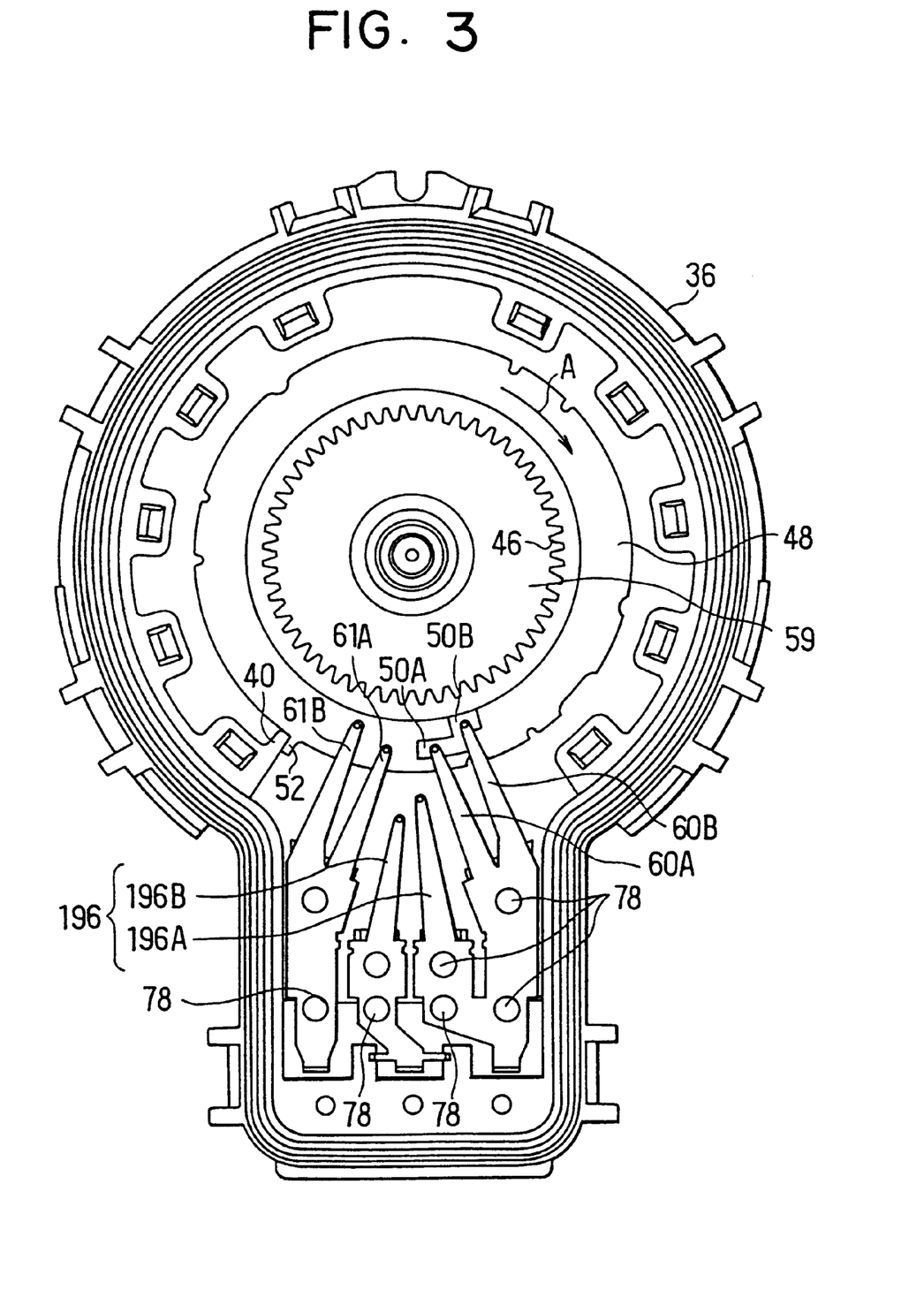
FIG. 3 is a plan view showing the inside structure of the position detector using one of two flanges.
Figure 4:
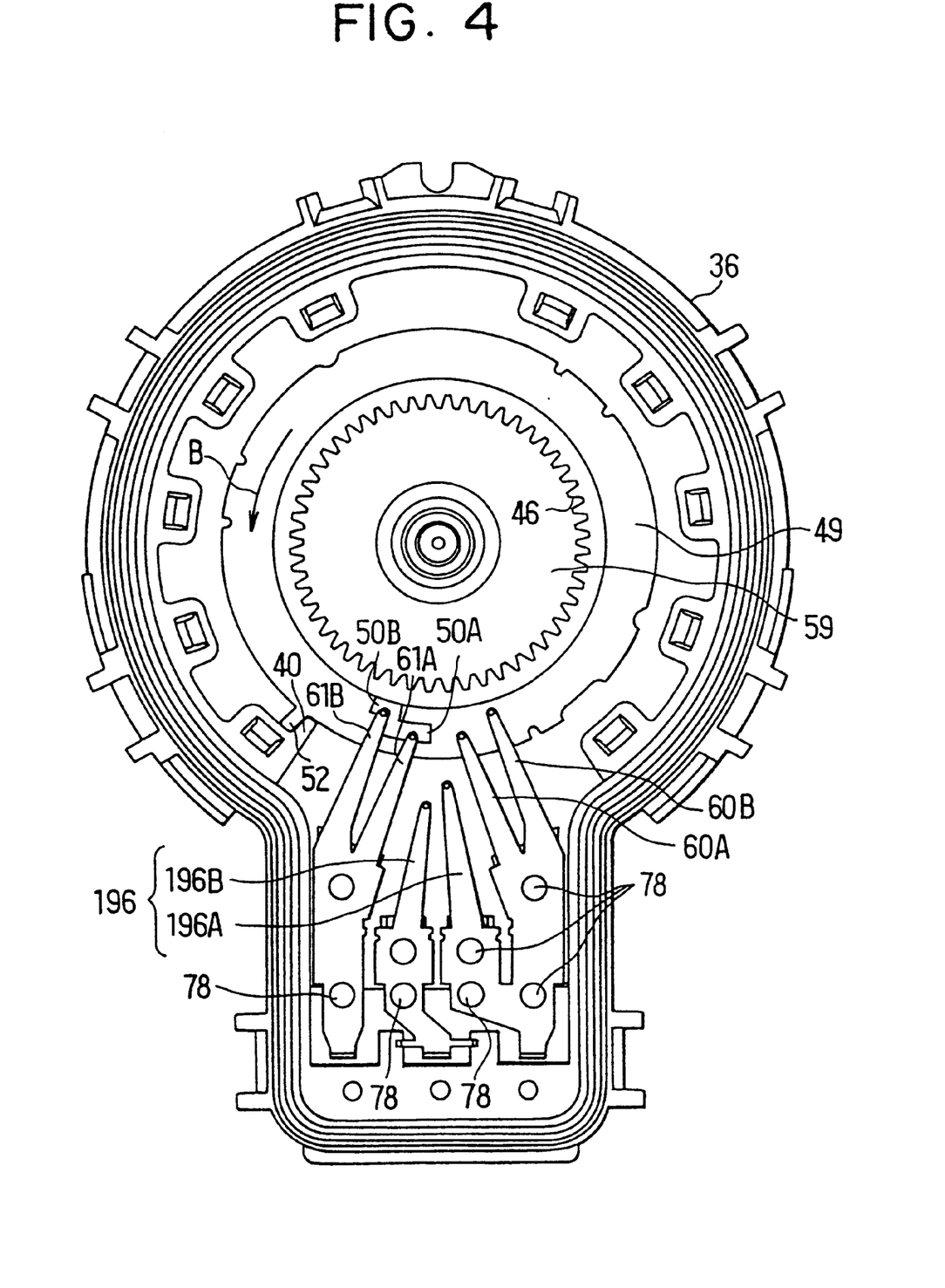
FIG. 4 is a plan view showing the inside structure of the position detector using the other of the two flanges.

As shown in FIGS. 3 and 4, the flange 48 or 49 formed integrally with the ring gear 46 is a conductive plate and has moving contacts 50A, 50B formed on the surface opposite to the cover plate 36. Thus, the ring gear 46 (flange 48 or 49) operates as a moving contact plate. Each of the moving contacts 50A, 50B is a nonconductive part formed into an arc shape having two steps, and is formed on the approximately same plane as the flange 48 or 49.

As shown in FIG. 3, one flange 48 (ring gear 46) having the moving contacts 50A and 50B is designed for use in the case of the forward rotation direction of the motor output shaft 20 (connection shaft 42), i.e., rotation direction A of the ring gear 46. On the other hand, as shown in FIG. 4, the other flange 49 (ring gear 46) having the moving contacts 50A and 50B is designed for use in the case of the reverse rotation direction of the motor output shaft 20 (connection shaft 42), i.e., rotation direction B of the ring gear 46. The two ring gears 46, i.e., flange 48 and 49, are provided for selectively used depending on the rotation direction of the motor output shaft 20. That is, depending on the direction of rotation of the ring gear to raise the window glass, either one of the flanges 48 and 49 is selected foe use.

Each flange 48, 49 has a protrusion 52 which extends radially outwardly from its outer periphery. The protrusion 52 abuts with the stopper protrusion 40 extending radially inwardly form the cover plate 36, when the ring gear 46 rotates to a specified position. Thus, in the case of FIG. 3, the flange 48 is restricted from rotating further in the direction A once the protrusion 52 comes into contact with the stopper protrusion 40. In the case of FIG. 4, the flange 49 is restricted from rotating further in the direction B once the protrusion 52 comes into contact with the stopper protrusion 40. It is to be noted that, although the rotation directions A and B in FIGS. 3 and 4 are opposite from each other, those directions are the from the standpoint of detecting the rotational position of the motor output shaft 20, i.e., position of the window glass. Thus, in either case, the specified position of the motor output shaft 20 is detected when the protrusion 52 of the ring gear 46 abuts the stopper protrusion 40.

In the internal perimeter part of the ring gear 46, two planetary gears 54 are disposed between the ring gear 46 and the sun gear 44. The planetary gears 54 are rotatably supported by a carrier 56 and engage with the ring gear 46 and the sun gear 44. That is, the sun gear 44, the ring gear 46 and the planetary gears 54 constitute the planetary gear train unit, which transmits the rotation of the connection shaft 42 (i.e., motor output shaft 20) through speed reduction. For example, when the revolution of the planetary gears 54 is restricted while the carrier 56 is maintained and secured, the rotation of the connection shaft 42 (i.e., shaft 20) can be reduced and is transmitted to the ring gear 46.

In this embodiment, the reduction ratio of the planetary gear train unit composed of the sun gear 44, the ring gear 46 and the planetary gears 54 is 5.2:1, and the unit is set so that the ring gear 46 will not make more than one rotation while a window glass moves one stroke (while sun gear 44 rotates 3 to 3.5 rotations). The reduction ratio of the planetary gear train unit is not limited to 5.2:1, however can be set to an arbitrary value as desired.

The planetary gear train unit including the sun gear 44, the ring gear 46 and the planetary gears 54 is covered by the cover plate 36 and is supported by a protective plate 92, thereby restricting the planetary gear train unit from being separated or dropped off from the cover plate 36. The peripheral part of the protective plate 92 is fixedly held by the cover plate 36 to hold the ring gear 46, carrier 56 and the like, so that those do not drop off from the cover plate 36. The protective plate 92 held between the pulse plate 192 and the ring gear 46 (flange 48 or 49) to restrict the pulse plate 192 and the ring gear 46 from moving and contacting each other.

A spring washer 58 and a washer 59 constituting a clutch mechanism are disposed between the cover plate 36 and the carrier 56. The spring washer 58 is attached integrally to the carrier 56. The washer 59 is press-fitted in the cover plate 36 to integrate with an inner peripheral surface of the cover plate 36, and the spring washer 58 contacts the washer 59 in a pressed state. Thus, the spring washer 58 constantly presses the carrier 56 so that the carrier 56 contacts the protective plate 92. Therefore, normally, the rotation of the carrier 56 is restricted by the pressing force of the spring washer 58 (frictional force between carrier 56 and protective plate 92), and the planetary gears 54 are supported in such a manner that the revolution of the planetary gears 54 is restricted. On the other hand, when the protrusion 52 of the flange 48 of the ring gear 46 makes contact with the protrusion 40 and the further rotation of the ring gear 46 in the forward direction is restricted, the forward direction rotation force of the sun gear 44 surpassing the pressing force (maintaining force) of the carrier 56 acts so that the spring washer 58 releases the maintenance of the carrier 56 and the planetary gears 54 can perform the revolution. That is, after the protrusion 52 of the flange 48 contacts the protrusion 40, the spring washer 58 can interrupt the transmission of the forward direction rotation force from the sun gear 44 (shaft 20) to the ring gear 46. Thus, when the protrusion 52 contacts the protrusion 40 so that the rotation of the ring gear 46 is restricted, if the sun gear 44 (shaft 20) rotates in the forward direction (direction to rotate ring gear 46 in forward direction), only the planetary gears 54 revolve.

Engagement nails 94 are provided on the periphery of the protective plate 92 which covers and holds within the cover plate 36 the planetary gear train unit (sun gear 44, ring gear 46 and planetary gears 54) and the spring washer 58. Each of the engagement nails 94 are bent perpendicularly toward the cover plate 36. The engagement nails 94 are press-fitted into the inner peripheral wall of the cover plate 36 to fixedly engage the protective plate 92 with the cover plate 36.

A pair of fixed sliding contacts 60A, 61A and another pair of fixed sliding contacts 60B, 61B as fixed sliding contact terminals are attached onto the cover plate 36. Each pair of the fixed sliding contacts 60A, 61A and the fixed sliding contacts 60B, 61B is a pair of resilient conductive contact terminals. The fixed sliding contact 60A is formed integrally with the fixed sliding contact 60B, and the fixed sliding contact 61A is formed integrally with the fixed sliding contact 61B. The sliding contacts have through holes 76.

As shown in FIGS. 3 and 4, the fixed sliding contacts 60A, 61A, 60B and 61B are fixedly attached to the cover plate 36 in position. That is, a plurality of protrusions 78 provided on the cover plate 36 are tightly fitted into the corresponding through holes 76 of the fixed sliding contacts 60A, 61A, 60B and 61B, respectively. Here, as understood from FIGS. 3 and 4, the cover plate 36 is formed symmetrically between the right side and the left side with respect to a line (vertical line in the figures) crossing the radial center of the cover plate 36. The protrusions 78 are arranged symmetrically between the left side and the right side with respect to the line crossing the radial center. The protrusions 78 and the through holes 76 define references for attaching the fixed sliding contacts 60A, 61A 60B, 61B to the cover plate 36.

Top end of each sliding contact fixed to the cover plate 36 extends toward the flange 48 or 49 of the ring gear 46. The top end resiliently contacts the flange 48 or 49 (peripheral surface opposite to the cover plate 36). That is, as shown in FIG. 7, the sliding contacts 60A, 61A and sliding contacts 60B, 61B extend from the inside of the cover plate 36 to contact under pressure with the conductive flange 48 or 49 (moving contacts 50A, 50B) of the ring gear 46.

The fixed sliding contacts 60A, 61A, 60B, 61B make contact with the moving contacts 50A, 50B at the specified rotation position of the ring gear 46, when the protrusion 52 of the ring gear 46 comes into contact with the stopper protrusion 40. As shown in FIGS. 3 and 4, the fixed sliding contacts 60A, 61A are positioned to contact the moving contact 50A, and the fixed sliding contacts 60B, 61B are positioned to contact the moving contact 50B.

Further, the fixed sliding contacts 60A, 61A, 60B, 61B are electrically connected to a control circuit of the power window device, and the moving contacts 50A, 50B respectively make contact with the fixed sliding contacts 60A, 60B to be in a nonconductive state. This enables the rotation position of the ring gear 46, that is, the rotation position of the sun gear 44 or the motor output shaft 20 to be detected. The fixed sliding contacts 60A, 61A and the fixed sliding contacts 60B, 61B are used for rotation control of the motor actuator 10.

The present embodiment is so designed that, for example, when the window glass reaches a position below the upper end stop position of the window glass, the protrusion 52 reaches a rotation position displaced by a specified rotation angle in the forward direction from the rotation position where the protrusion 52 contacts the protrusion 40, and at this point, the moving contacts 50A, 50B make contact with the fixed sliding contacts 60A, 60B to become nonconductive. Further, this nonconductive state is maintained until the protrusion 52 contacts the protrusion 40.

Alternatively, it may be so designed that when the window glass reaches a position below the upper end stop position of the window glass and the protrusion 52 reaches a rotation position displaced by a specified rotation angle in the forward direction from the rotation position where the protrusion 52 contacts the protrusion 40, the moving contacts 50A, 50B make contact with the fixed sliding contacts 60A, 61A and the fixed sliding contacts 60B, 61B to become conductive, thereby performing the position detection. Further, once the moving contacts 50A, 50B become conductive or nonconductive as described above, it is not always necessary to electrically maintain such conductive state or nonconductive state. By detecting a trigger signal generated from the contact between the moving contacts 50A, 50B and the fixed sliding contacts 60A, 61A, 60B, 61B, it can be determined that the protrusion 52 reaches a specified rotation position.

Further, the position detector 30 has the pulse plate 192 and the sliding contact 196 for detecting each incremental and decremental rotational movement of the motor output shaft 20. The pulse plate 192 is formed into a thin circular plate made of resin, and the fitting hole 198 is formed at a central part of the pulse plate 192. The fitting hole 198 is formed into a cross-shape to correspond to the sectional shape of the connection shaft 42 and the protrusion parts 45 formed on the connection shaft 42, so that the connection shaft 42 and the protrusion parts 45 are inserted into the fitting hole 198. That is, the protrusion parts 45 of the connection shaft 42 provided with the sun gear 44 are inserted into the fitting hole 198 of the pulse plate 192 and the top end of the protrusion 45 is clamped. Therefore, the pulse plate 192 is integrally connected to the connection shaft 42 (sun gear 44), and thereby the pulse plate 192 is constantly rotated integrally with the connection shaft 42.

Further, a conductive pattern 194 is formed on the pulse plate 192. The conductive pattern 194 is formed in the periphery of the pulse plate 192 along the perimeter direction, and includes a ring-shaped first conductive pattern 194A and a second conductive pattern 194B which is adjacent to the first conductive pattern 194A and has a sequential pulse-shaped uneven surface (conductive part and nonconductive part). The conductive pattern 194 (first conductive pattern 194A and second conductive pattern 194B) is formed by plating metal material such as nickel on a resin plate.

The sliding contact 196 has the input contact 196A and the output contact 196B, both being made of copper, for example. The sliding contact 196 and the fixed sliding contacts 60A, 61A, 60B, 61B are fixed to the cover plate 36. The sliding contact 196 fixed to the cover plate 36 extends toward the conductive pattern 194. The input contact 196A constantly makes contact with the first conductive pattern 194A of the conductive pattern 194. The output contact 196B makes contact with the second conductive pattern 194B of the conductive pattern 194. Thus, the pulse signal can be detected as the pulse plate 192 rotates. The detected pulse signal is used for a moving position control of a moving body (window glass).

The conductive pattern 194 may be formed on the side wall of the periphery of the pulse plate 192 instead of the upper surface thereof. In this case, the sliding contact 196 is secured to the cover plate 36 to oppose the side peripheral wall of the pulse plate 192.

The base plate 34 and the cover plate 36 which encase the above various component parts are engaged to be an integral unit, with engagement nails 70 provided on the peripheral part of the base plate 34 being fitted with nail receiving pats 72 provided on the cover plate 36. Thus, the position detector 30 is formed into a thin cylindrical shape.

A protrusion 96 is provided annularly on the inner surface of the base plate 34. As shown in FIG. 7, the protrusion 96 is positioned to face the vicinity of the periphery (engagement nails 94) of the protective plate 92, under the condition that the base plate 34 and the cover plate 36 are united together. Thus, the protective cover 92, which is engaged with the cover plate 36 via engagement nails 94, is restricted from disengaging from the cover plate 36.

Further, a plurality of fitting parts 74 are formed on the periphery of the cover plate 36. The fitting parts 74 correspond to the clamping parts 28 of the cover 24, and each of the T-shaped leading edges of the clamping parts 28 is inserted into each of the fitting parts 74. That is, each of the T-shaped leading edges of the clamping parts 28 is fit into each of the fitting parts 74 by fastening the clamping parts 28, thereby supporting the periphery of the cover plate 36 and securing the position detector 30 to a predetermined position on the cover 24.

Recesses 82 are provided in the inner surface of the base plate 34. As shown in FIG. 7, the recesses 82 are positioned to receive the protrusions 78 of the cover plate 36, respectively, so that they face the thermally clamped parts of the protrusions 78 under the condition that the base plate 34 and the cover plate 36 are united into a single unit. The recesses 82 and surrounding parts of the base plate 34 are sized to be positioned closely to the sliding contacts 60A, 61A, 60B, 61B and 196. Thus, the sliding contacts 60A, 61A, 60B, 61B and 196 are restricted from dropping off from the cover plate 36.

Next, an operation of the present embodiment is described with reference to the flow chart shown in FIG. 10 with respect to the case in which the window glass moves upwardly in response to the operation of an ascent switch of the power window device.

In the above motor actuator 10 having the position detector 30, when the ascent switch of the power window device is operated at step 201, the motor actuator 10 is driven to rotate the shaft 20 at step 202 so that the window regulator is actuated and the window glass is raised.

Normally (while window glass is ascending), the carrier 56 is pressed and supported by the spring washer 58 so that the revolution of the planetary gears 54 is stopped. Therefore, with the rotation of the shaft 20, the rotation force of the connection shaft 42 (i.e., sun gear 44) is reduced through the planetary gears 54 and is transmitted to the ring gear 46. As a result, the ring gear 46 gradually starts rotating in the forward direction.

Next, at step 204, whether or not the motor actuator 10 has reached the specified rotation position, that is, whether or not the window glass has reached the specified position below upper end stop position is detected by the position detector 30.

That is, in the position detector 30, with the rotation of the shaft 20, the rotation force of the connection shaft 42 (i.e., sun gear 44) is reduced through the planetary gears 54 and transmitted to the ring gear 46, so that the ring gear 46 gradually starts rotating in the forward direction. However, if the window glass does not reach the specified position below the upper end stop position, the protrusion 52 is greatly away from the protrusion 40, resulting in that the moving contacts 50A, 50B do not make contact with the fixed sliding contacts 60A, 61A and fixed sliding contacts 60B, 61B. Thus, the rotation position of the shaft 20 (window glass does not reach the specified position below upper end stop position) is detected. In this case, with the motor actuator 10 being actuated, the control process moves to step 206, and it is detected whether or not any foreign article is pinched between the window glass and the window frame based on the lock current of the motor actuator 10 or the like. When it is detected that something is pinched, the motor actuator 10 is rotated in the reverse direction at step 208, so that the window glass descends. On the other hand, when it is determined that nothing is pinched at step 206, the control process returns to step 204.

When the window glass reaches the specified position below the upper end stop position at step 204, the protrusion 52 reaches a rotation position displaced by a specified rotation angle in the forward direction from the rotation position where the protrusion 52 contacts the protrusion 40. Further, at this point, the moving contacts 50A, 50B make contact with the fixed sliding contacts 60A, 60B to be in a nonconductive state, and thus the rotation position of the shaft 20 (window glass reaches the specified position below upper end stop position) is detected.

When it is detected at step 204 that the shaft 20 of the motor actuator 10 has reached a predetermined rotation position, that is, that the window glass has reached the predetermined position, the control process proceeds to step 210 while the motor actuator 10 is continuously operated. At this point, the nonconductive state of the moving contacts 50A, 50B is maintained although each of the relative contact positions between the moving contacts 50A, 50B and the fixed sliding contacts 60A, 61A, 60B, 61B is changed due to the rotation of the ring gear 46.

At step 210, it is determined whether or not the window glass is fully closed according to the lock current or the like of the motor actuator 10. When the full closure of the window glass is detected, the motor actuator 10 is stopped at step 212 and the control process is completed.

Thus, in the position detector 30, by using the moving contacts 50A, 50B rotating together with the ring gear 46 and each pair of the fixed sliding contacts 60A, 61A and fixed sliding contacts 60B, 61B, the rotation position of the shaft 20, that is, the position of the window glass (whether or not window glass reaches the fixed position below upper end stop position) can be accurately detected.

Further, the position detector 30 can be automatically set to its initial state in which the moving contacts 50A, 50B of the position detector 30 make contact with the fixed sliding contacts 60A, 60B by sufficiently rotating the shaft 20 of the motor actuator 10 in the forward direction after installing the motor actuator 10 in the vehicle.

That is, when the shaft 20 of the motor actuator 10 is sufficiently rotated in the forward direction after installing the motor actuator 10 in the vehicle, the protrusion 52 of the flange 48 of the ring gear 46 contacts the protrusion 40, thereby restricting the ring gear 46 from further rotating in the forward direction. When the shaft 20 further rotates under this condition, the rotation force of the sun gear 44 surpassing the pressing force (holding force) of the carrier 58 acts, and the spring washer 58 cancels the holding of the carrier 56 so that the revolution of the planetary gears 54 can be performed. That is, the spring washer 58 can shut off the transmission of the rotation force in the forward direction from the sun gear 44 (shaft 20) to the ring gear 46 after the protrusion 52 of the flange 48 contacts the protrusion 40. Therefore, when the sun gear 44 (shaft 20) rotates in the forward direction (direction in which ring gear 46 is to move in forward direction) while the rotation of the ring gear 46 is stopped due to contact between the protrusion 52 and the protrusion 40, only the planetary gears 54 revolves. Accordingly, after the protrusion 52 contacts the protrusion 40 and the moving contacts 50A, 50B make contact with the fixed sliding contacts 60A, 60B, the ring gear 46 does not move even if the shaft 20 of the motor actuator 10 rotates in the forward direction, and the contact state between the moving contacts 50A, 50B and the fixed sliding contacts 60A, 60B is maintained. Thus, by once sufficiently rotating the shaft 20 of the motor actuator 10 in the forward direction, the motor actuator 10 is automatically set to its initial state in which the protrusion 52 contacts the protrusion 40 and the moving contacts 50A, 50B make contact with the fixed sliding contacts 60A, 60B.

Figure 5:
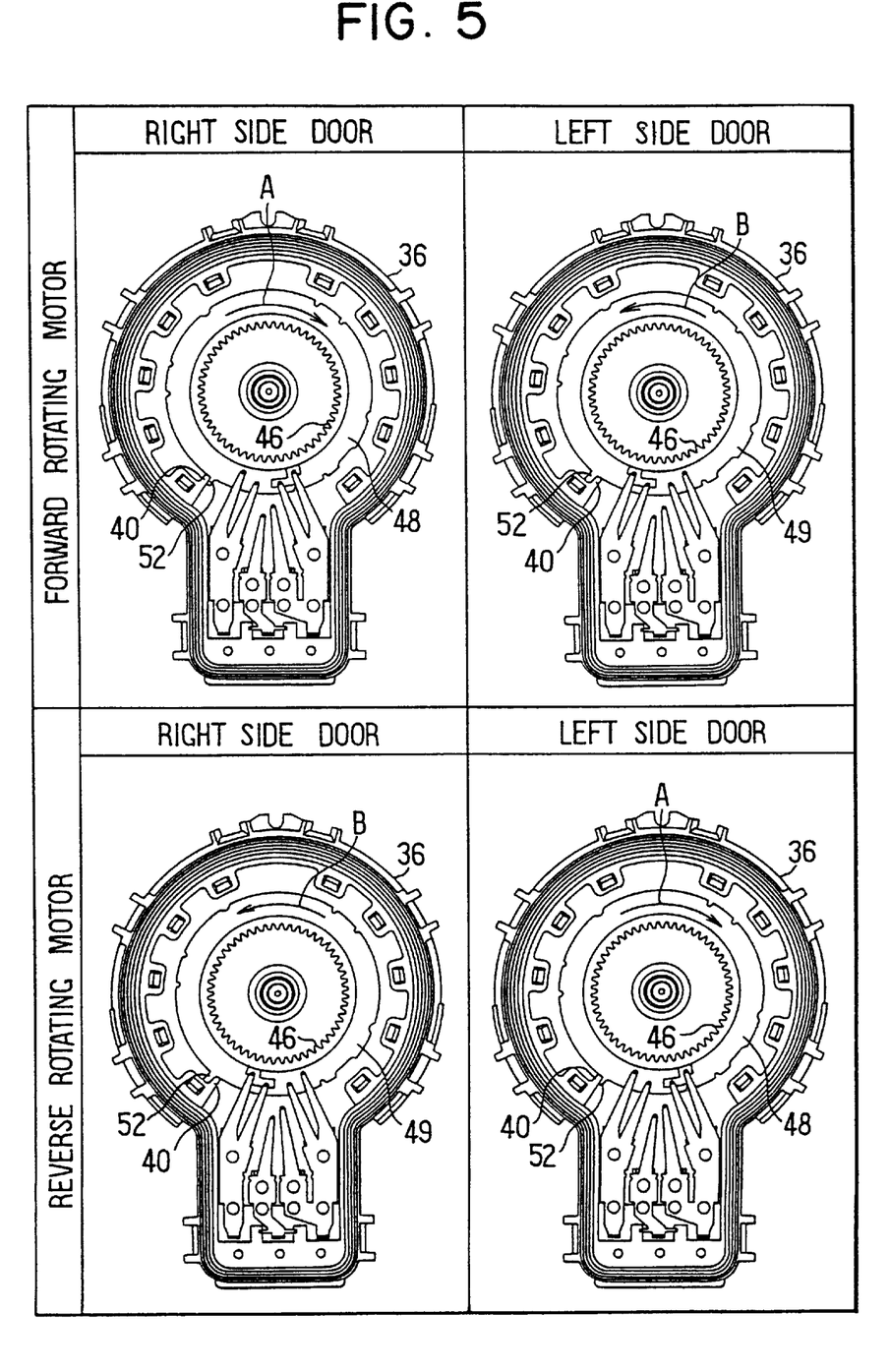
FIG. 5 is a view showing the inside structure of the position detector used in a vehicle power window, in different combinations of motors and doors in the first embodiment.

In the above embodiment, when the motor 10 is set as a forward rotating motor (rotation direction of the motor part 10A is set as a forward rotating direction), the rotating direction of the motor output shaft 20 is set oppositely from each other for the right side door and the left side door because of gear engagement between the worm gear 14 and the rotation gear wheel 16. Thus, the rotation direction of the ring gear 46 becomes opposite from each other between the right side door and the left side door. However, as shown in FIG. 5, by selecting appropriate one of the flanges (flange 48 for forward rotation direction and flange 49 for reverse rotation direction), the same cover plate 36 having the fixed sliding contacts 60A, 61A, 60B, 61B and 196 may be used for either position detector 30 to be installed on the right side door and the left side door. When the motor 10 is set as a reverse rotating motor (rotation direction of the motor part 10A is set as a reverse rotating direction), the flanges 48 and 49 are used oppositely from the above case of the forward rotating motor for the right side door and the left side door so that the same cover plate 36 may be used for the position detectors to be installed on the right side door and the left side door. Thus, the position detector 30 need not be designed separately for the right side door and the left side door.

Second Embodiment

Figure 9:
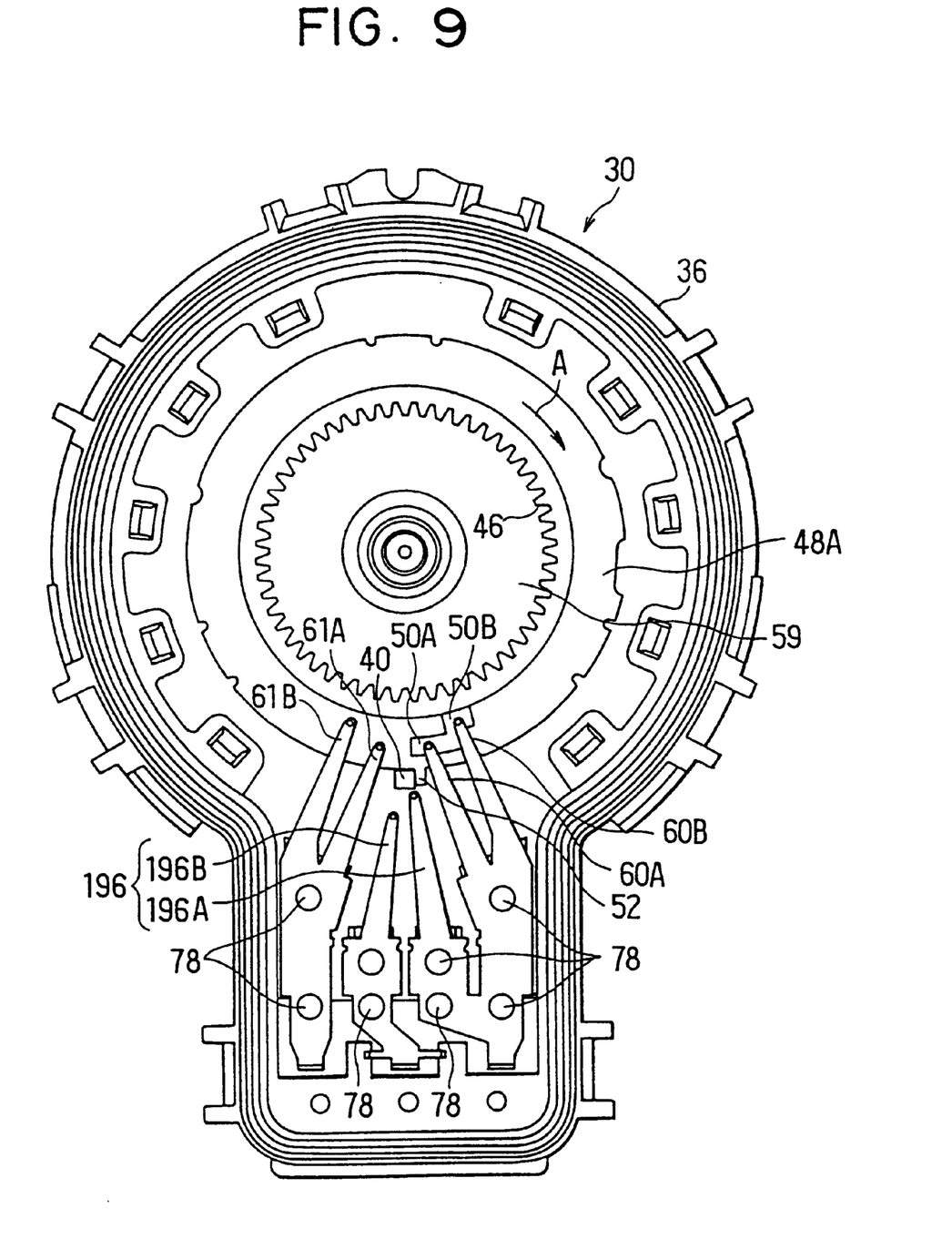
FIG. 9 is a plan view showing the inside structure of a position detector using one side of a flange according to a second embodiment.
Figure 10:
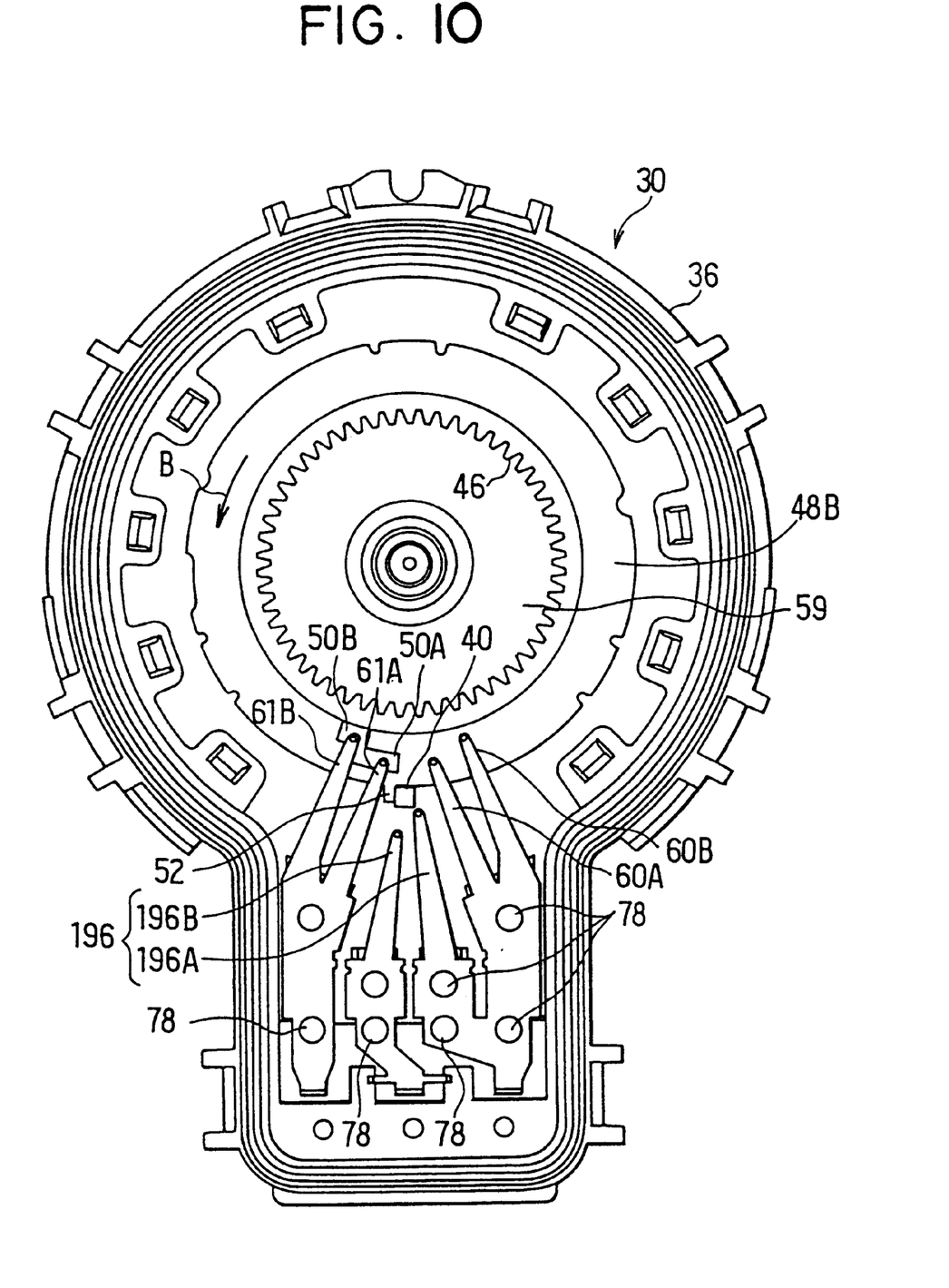
FIG. 10 is a plan view showing the inside structure of the position detector using the other side of the flange.

In this embodiment shown in FIGS. 9 and 10 also, the stopper protrusion 40 is formed on the inside surface of the cover plate 36 of the position detector 30. The stopper protrusion 40 is integral with the cover plate 36 and located on the cover plate center line, with respect to which the cover plate 36 is symmetrical, at the side of the fixed sliding contacts 60A, 61A, 60B, 61B (lower side in the figures). The fixed sliding contacts 60A, 61A are also symmetrical with the fixed sliding contacts 60B, 61B with respect to the cover plate center line. The stopper protrusion 40 is provided to restrict rotation of the ring gear 46 from rotating further once the flange 48 (48A, 48B) of the ring gear 46 rotates and its protrusion 52 abuts the stopper protrusion 40 at the specified position of the motor output shaft 20.

The flange 48 has the moving contacts 50A and 50B on both top side surface 48A (FIG. 9) and bottom side surface 48B (FIG. 10). The moving contacts 50A and 50B are formed symmetrically between the top side surface 48A and the bottom side surface 48B so that the either one of the top side surface 48A and the bottom side surface 48B of the flange 48 may be used selectively depending on the side (right or left) of the door to which the power window device is installed. Thus, the cover plate 36 may be used commonly, irrespective of the used side of the flange 48.

As shown in FIG. 9, the top side surface 48A of the flange 48 having the moving contacts 50A and 50B is designed for use in the case of the forward rotation direction of the motor output shaft 20, i.e., rotation direction A of the ring gear 46. On the other hand, as shown in FIG. 10, the bottom side surface 48B of the flange 48 (ring gear 46) having the moving contacts 50A and 50B is designed for use in the case of the reverse rotation direction of the motor output shaft 20,i.e., rotation direction B of the ring gear 46. That is, the position and the shape of the moving contacts 50A and 50B on the top side surface 48A and the bottom side surface 48B are determined so that, when the flange 48 is restricted from rotating further by the abutment of its protrusion 52 with the stopper protrusion 40 of the cover plate 36, the fixed sliding contacts 60A, 60B contact with the moving contacts 50A, 50B (FIG. 9) or the fixed sliding contacts 61A, 61B contact with the moving contacts 50A and 50B (FIG. 10). That is, the moving contacts 50A and 50B are provided on the top side surface 48A at the right side (FIG. 9) of the protrusion 52 for contact with the fixed sliding contacts 60A, 60B, while the moving contacts 50A and 50B are provided on the bottom side surface 48B at the left side (FIG. 10) of the protrusions 52 for contact with the fixed sliding contacts 61A, 61B.

Figure 11:
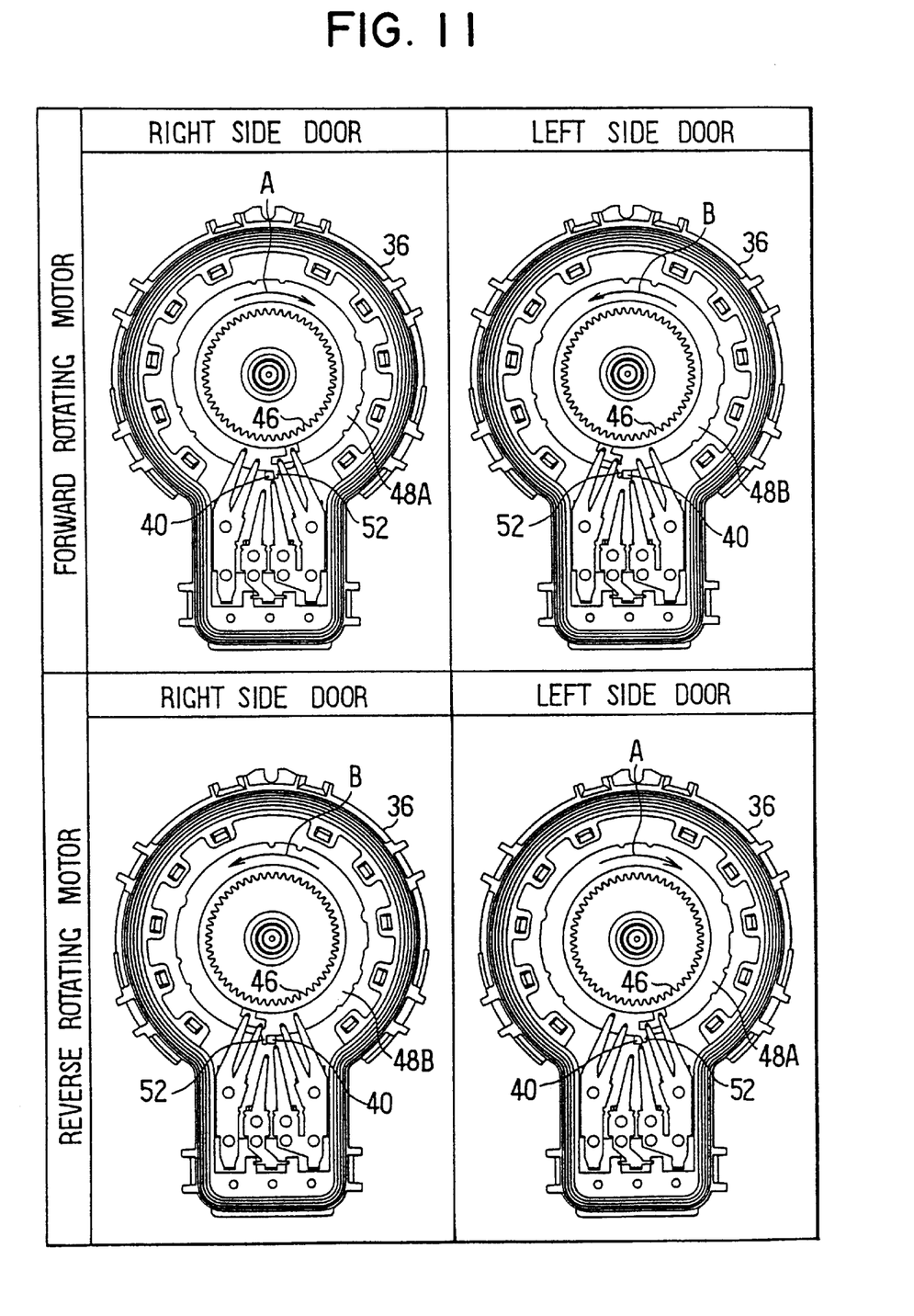
FIG. 11 is a view showing the inside structure of the position detector used in a vehicle power window, in different combinations of motor and doors in the second embodiment.

In the second embodiment also, when the motor 10 is set as a forward rotating motor (rotation direction of the motor part 10A is set as a forward rotating direction), the rotating direction of the motor output shaft 20 is set oppositely from each other for the right side door and the left side door because of gear engagement between the worm gear 14 and the rotation gear wheel 16. Thus, the rotation direction of the ring gear 46 becomes opposite from each other between the right side door and the left side door. However, as shown in FIG. 11, by selecting appropriate one of the flange surfaces (top side surface 48A for forward rotation direction and bottom side surface 48B for reverse rotation direction), the same flange 48 having the symmetrical surfaces 48A and 48B and the same cover plate 36 having the fixed sliding contacts 60A, 61A, 60B, 61B and 196 may be used for either position detector 30 to be installed on the right side door and the left side door. When the motor 10 is set as a reverse rotating motor (rotation direction of the motor part 10A is set as a reverse rotating direction), the flange surfaces 48A and 48B are used oppositely from the above case of the forward rotating motor for the right side door and the left side door so that the same flange 48 and the same cover plate 36 may be used for the position detectors to be installed on the right side door and the left side door. Thus, the position detector 30 need not be designed separately for the right side door and the left side door.

In the second embodiment, the stopper protrusion 40 is formed at the side of the fixed sliding contacts 60A, 60B, 61A, 61B, specifically between the fixed sliding contacts 60A, 60B and fixed sliding contacts 61A, 61B, where the vibration and displacement of the ring gear 46, which may be caused by the clearance between the ring gear 46 (flange 48) and the cover plate 36, is the least. Therefore, variation in the sliding contact position of the sliding contacts 60A, 60B, 61A, 61B on the moving contacts 50A, 50B is reduced to a minimum.

The present invention should not be limited to the above embodiments, but may be modified in other ways. For instance, the present invention may be applied to other moving objects such as a sunroof device which drives a vehicle roof linearly.

What is claimed is:

1. A position detecting apparatus for a moving object driven by a motor rotatable in forward and reverse directions, the apparatus comprising:

a moving contact plate connectable to an output shaft of the motor and rotatable with the output shaft;

a cover plate accommodating the moving contact plate rotatably therein and having a stopper protrusion which stops rotation of the moving contact plate at a specified rotational position of the output shaft; and a fixed sliding contact fixed to the cover plate and slidable on the moving contact plate to detect the specified rotational position of the output shaft, wherein the moving contact plate has at least one of two types of moving contact patterns, one of which is for a forward rotation direction of the output shaft and the other of which is for a reverse rotation direction of the output shaft, so that the fixed sliding contact detects the specified rotational position of the output shaft when the moving contact plate is stopped from rotating by the stopper protrusion.

2. A position detecting apparatus of claim 1, wherein:

the moving object is a vehicle power window device; and the two conductive patterns are used for two power window devices mounted in a right side door and a left side door, respectively.

3. A position detecting apparatus of claim 1, wherein:

the two moving contact patterns are formed on two separate plates, respectively, so that one of the two moving contact patterns contacts the fixed sliding contact.

4. A position detecting apparatus of claim 3, wherein:

the stopper protrusion is dislocated away from a center line of the cover plate which divides the cover plate symmetrically.

5. A position detecting apparatus of claim 3, wherein:

the stopper protrusion is located closely to the fixed sliding contact.

6. A position detecting apparatus of claim 1, wherein:

the two moving contact patterns are formed on two side surfaces of the moving contact plate, respectively, so that one of the two moving contact patterns contacts the fixed sliding contact.

7. A position detecting apparatus of claim 6, wherein:

the stopper protrusion is located on a center line of the cover plate which divides the cover plate symmetrically and at a side of the fixed sliding contact; and the two side surfaces of the moving contact plate are symmetric therebetween.

8. A position detecting apparatus of claim 7, wherein:

the fixed sliding contact has a pair of contacts which are arranged symmetrically with respect to the center line of the cover plate.

* * * * *